United States Patent
Du Bois

(10) Patent No.: US 7,821,147 B2
(45) Date of Patent: Oct. 26, 2010

(54) RAPID RESPONSE PORTABLE HYBRID EMERGENCY ENERGY GENERATOR

(76) Inventor: Antolin Du Bois, 152-04 Bayside Ave., Flushing, NY (US) 11354

(*) Notice: Subject to any disclaimer, the term of this patent is extended or adjusted under 35 U.S.C. 154(b) by 26 days.

(21) Appl. No.: 12/243,965

(22) Filed: Oct. 1, 2008

(65) Prior Publication Data

US 2010/0078942 A1  Apr. 1, 2010

(51) Int. Cl.
*F03D 9/00* (2006.01)

(52) U.S. Cl. .............................. 290/44; 290/54; 290/42; 290/55

(58) Field of Classification Search ............... 290/54, 290/42, 44, 55
See application file for complete search history.

(56) References Cited

U.S. PATENT DOCUMENTS

| | | | |
|---|---|---|---|
| 5,027,735 A * | 7/1991 | Labrador | 114/39.26 |
| 6,016,015 A | 1/2000 | Willard, Jr. | |
| 6,246,125 B1 | 7/2001 | Axtell | |
| 6,650,891 B1 * | 11/2003 | Wierzbitzki et al. | 455/414.3 |
| 7,075,189 B2 * | 7/2006 | Heronemus et al. | 290/44 |
| 7,105,940 B2 | 9/2006 | Weesner et al. | |
| 7,612,462 B2 * | 11/2009 | Viterna | 290/53 |
| 2008/0196758 A1 | 8/2008 | McGuire | |

FOREIGN PATENT DOCUMENTS

| | | |
|---|---|---|
| CA | 2610507 | 5/2008 |
| GB | 2427003 | 6/2006 |
| WO | WO 2006015850 | 2/2006 |

* cited by examiner

*Primary Examiner*—T C Patel
*Assistant Examiner*—Iraj A Mohandesi

(57) ABSTRACT

A portable, tow-able, buoyant hybrid renewable energy platform for producing and storing electrical energy using wind, water, and solar power, or a combination of these methods. Included on this platform is a wind turbine that semi-detaches to become a water turbine, if necessary. A small fuel backup generator is provided for, as is a system for air-portage and stabilizing the device.

1 Claim, 1 Drawing Sheet

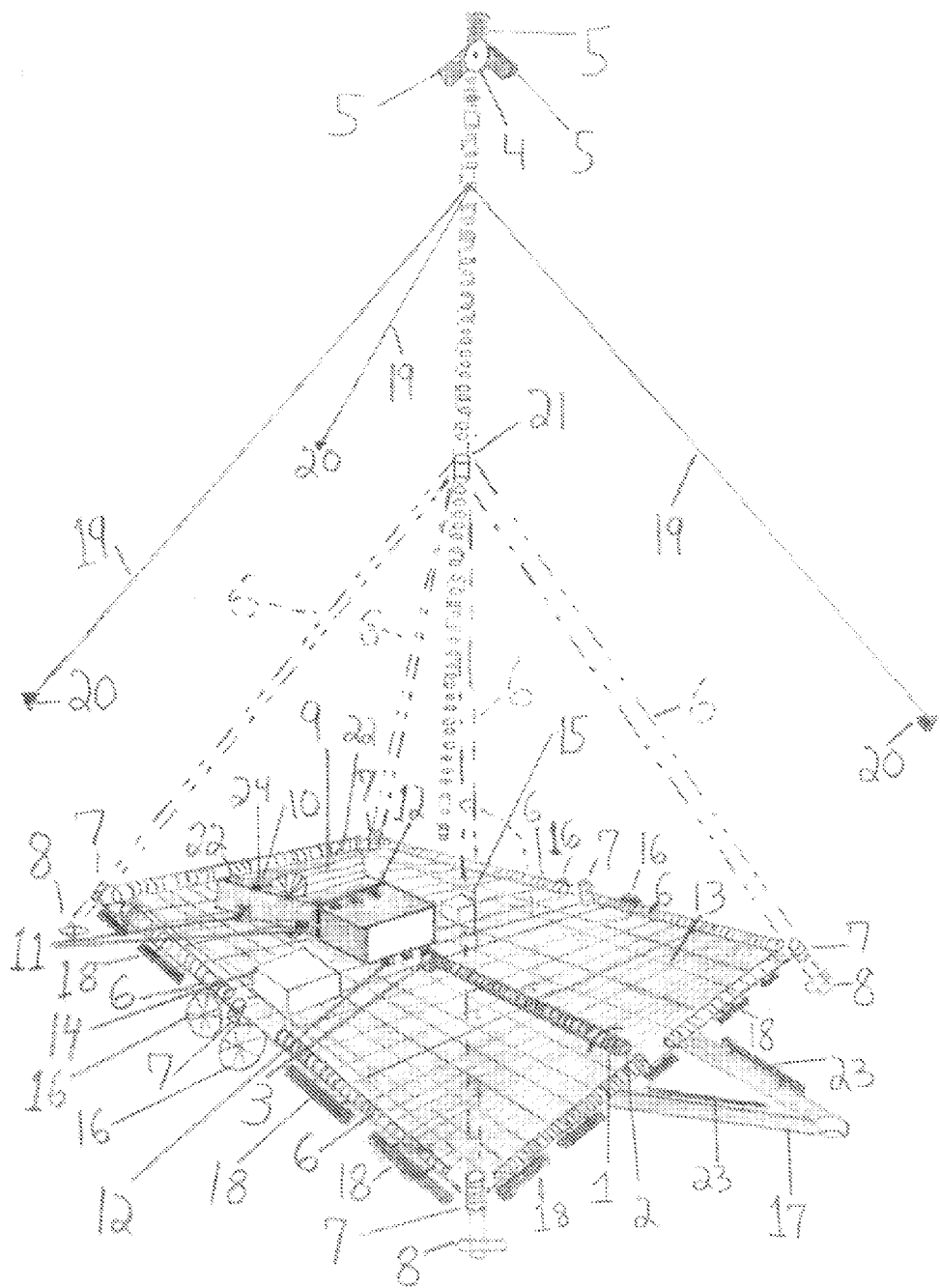

RAPID RESPONSE PORTABLE HYBRID EMERGENCY ENERGY GENERATOR

BACKGROUND OF THE INVENTION

This invention relates to a large renewable energy source generator, more particularly it relates to a hybrid renewable energy source providing wind, hydroelectric, and photovoltaic electrical generation. A small backup generator is included, but the intent of the present invention is to provide immediate electrical energy using renewable sources of energy.

The last few years have seen large and varied calamities around the world: earthquakes in China, tsunamis in Southeast Asia, and floods in Bangladesh. The United States has not escaped natural or man-made disasters either. Examples include the near total Northeast blackout of 2003, the massive flooding by Katrina in 2005, and more recently the devastation of Ike in September of 2008.

Although all of these disasters have had different causes, and have affected different locales on different dates, what has remained constant is the need for electrical power immediately after the event for purifying water, medical supplies refrigeration, or food storage. Yet when the need for electrical power is greatest is often when the electrical grid is not functioning properly, or totally non-existent. Additionally, when these calamities create road blockages, repair crews have a tougher time repairing the electrical grid, and inaccessible regions can go weeks without a restoration of power. Basing emergency electrical power only upon traditional sources of energy, for example a portable gasoline fired generator, might be logistically impossible to deliver and re-supply in the immediate aftermath of catastrophic events. Furthermore, when a catastrophic event in ongoing, or occurs in a rain soaked, arid, or low-wind region, basing emergency electrical power output only upon a depletable energy source or only one source of renewable energy is not a wise decision. What is needed, then, is an easily deployable portable renewable electrical energy platform that allows for primarily the use of renewable energy power, but provide for a small backup generator, to generate and/or store electricity.

Others have seen the need for portable energy platforms, and especially portable renewable energy platforms. US Publication 20030057704 discloses a truck based mobile generator. No mention is given to a scenario when roads are blocked.

U.S. Pat. No. 6,246,125 discloses a portable wind and water generator. Solar power is not mentioned in this invention, which eliminates a major potential source of post-catastrophic energy for an emergency response generator, namely the sun.

GB Patent 2427003 discloses a hybrid wind turbine, with solar panels as an option. Portability to blocked areas is not addressed, nor can this invention rely upon hydroelectric power as a source of energy.

U.S. Pat. No. 6,016,015 discloses a solar wind turbine, in this case the sun is reflected off of mirrors and heats the air within an enclosure, and the rising hot air then turns a turbine. This invention, requiring a semi-permanent turbine fixture and a plurality of reflecting mirrors, while meeting its goal of pumping water in an emergency situation, will not adequately meet the energy needs of an emergency response generator, mainly because it is only operable during a sunny day.

WO 2006015850 discloses a combination wind and solar hybrid energy unit, with the solar panels mounted onto the blades. However, this design does not seem to be mobile, and again does not incorporate the allowance for water based electrical energy generation.

U.S. Pat. No. 7,105,940 discloses a mobile wind and solar power system. As it is designed, it must be towed behind a vehicle on developed roads, no allowance is given for road blockages, nor can it use water power to develop electrical energy; this invention is more designed for a solitary person living off-grid in a windy or sunny area, or for a group of scientists conducting experiments in remote regions. Also, this patent's designers attempt to alleviate the high wind tipping forces attributed to the invention's side placed turbine and side expanding panels with large stabilizers, but these must presumably be very heavy to counter the tipping effect of high winds and therefore work against this invention's use as a rapidly deployable emergency response device.

US Publication 2008/0196758, and CA 2610507, each disclose massive hybrid generating stations. These are brought to one location, but are designed to be stationary thereafter. As with GB Patent 2427003, the portability extends to the transportation to the site: frequent human transportation of the unit between sites is not envisioned in either proposed invention. Also, neither of these two inventions includes hydroelectric power as a source of energy. Lastly, both of these inventions assume a stable and flat ground upon which the invention would reside, but in the case of many natural disasters, flat stable ground might simply be unavailable.

U.S. Pat. No. 6,559,552 utilizes four sources of energy: rain, wind, wave, and solar. Although this is a hybrid renewable energy platform, it seems best designed to be used at sea or in a river where wave power can be gleaned.

U.S. Pat. No. 6,100,600 discloses a multi-hybrid renewable energy platform, one that uses hydroelectric power, wind power, and solar radiation. This invention would not meet land based emergency response needs because it is designed to float on the ocean's surface.

U.S. Pat. No. 6,172,429 discloses a solar, wind, and water energy platform, but it is designed to be stationary, located near a building, and thus again does not meet the needs of a rapid response emergency generator.

BRIEF DESCRIPTION OF THE INVENTION

The above discussed and other drawbacks and deficiencies are overcome or alleviated in a system and methods of transporting a redundant renewable energy source generator including two wind energy extraction devices, a water energy extraction device, a solar energy extraction device, and a small backup fuel powered generator on a portable, tow-able, and buoyant platform.

In an exemplary embodiment, a hybrid renewable redundant energy generator includes a multi-hybrid energy source buoyant and easily transportable platform adapted for rapid deployment in a remote area, a redundant energy source generator including a solar energy extraction device, a collapsible wind energy extraction device, and a second wind energy extraction device that can convert to a water energy extraction device, a small backup fuel generator, a transport device that is tow-able, buoyant, and portable, a battery system operably connected to the redundant renewable energy source generator, configured to store or produce for immediate use electrical energy generated by the redundant renewable energy source generator.

In one exemplary embodiment, solar and wind and hydroelectric power are mounted on a hybrid platform to create a portable hybrid electrical generator system, and a backup fuel based generator system is stored. The system uses hybrid sources of energy that regularly utilizes solar and wind and water power via a photovoltaic array and one or more wind or water turbines to charge a battery or an appliance that is connected to an inverter such that either AC or DC power can be used and/or stored. Also, the lower horizontally mounted turbine with its venturi aperture can be easily converted to a water turbine through two sets of hinges placed in front of the small end of the venturi aperture, allowing the turbine to 'drop down' to the water level and funnel water through the venturi aperture. As a backup system, should there be insufficient wind, water, or solar power, a small fuel generator is also included in the design of the instant invention. However, the wind, water, solar systems, and backup fuel generator are not inexorably linked, should environmental issues or safety conditions dictate, either the wind, water, solar system, or backup fuel generator may each be used independently of one other.

The above discussed and other features and advantages of the present invention is appreciated and understood by those skilled in the art from the following detailed descriptions and drawing.

BRIEF DESCRIPTION OF THE DRAWINGS

FIG. 1 is the front perspective of the exemplary embodiment of the rapid response hybrid renewable energy generator.

DETAILED DESCRIPTION OF THE INVENTION

FIG. 1. is the three dimensional view of the rapid response emergency generator. Telescoping wind turbine with a predetermined radius support rod 1 is shown at rest with smaller radii telescoping rods 2 internally contained. Using a universal swivel joint 3 centered in the middle of platform 13, capable of swiveling at least 90 degrees normal and 180 degrees within its resting plane, telescoping rod 1 with internally contained rods 2 expand to support wind turbine 4 with detachable blades 5. In the exemplary embodiment, the rods should be extendable at least to 100 ft but may be higher, and the suggested model to be used is the skystream 3.7, which can produce 400 kwh/month in an average 12 mph wind, however other models may be substituted should a lower cost or a higher efficiency, or both, be attained. A traditional pole mounted wind turbine's electrical power generation is directly related to the height of the turbine, obstructions nearby, and the size of the rotor's diameters. The skystream 3.7 rotors are 12 feet in diameter or 6 feet each, so when not in use they would be detached and securely fastened to the platform for transport, as would any other substituted model's rotors. The telescoping rod 1 is centrally mounted to so as to reduce the possibility of tipping.

Referring now to the support system for the turbine, we have standard guy wires numbered 19 are staked using stakes numbered 20. Three are shown, but more may be used as needed. However, the ground may be rocky or unstable, for example immediately after an earthquake, so further support is given at joining instrument 21, where a plurality of supporting rods 6, shown both at rest at around the edge of the platform and extended meet. Additionally, should the turbine and the platform need more support, rods numbered 6 are placed through grommets 7, which are all constructed at a pre-determined angle so as to allow support rods 6 to meet at joining tool 21. When not in use, the rods numbered 6 are attached to the frame of the trailer. Grommets 7 are movable in position and have a variable diameter to allow the rods entry and positioning, but are fixed in position and in diameter once the wind turbine is raised. Grommets 7 are made of a strong metal or strong composite material, it is through these grommets that ropes or wires or other support material will be placed and tied securely to fly the energy platform to inaccessible areas by air. Six grommets numbered 7 are shown, but this number can be higher or lower as needed. At the base of each pole numbered 6 an adjustable base 'boot' numbered 8 connects to each rod numbered 6, which allows for balancing the energy platform in uneven or unstable terrain. When at rest, the base boots, guy wires, and stakes are stored in box numbered 15, as well as a small backup fuel powered electrical generator. The other box numbered 14 contains the electrical equipment- the inverter, regulator, batteries, and battery charger, and all other electrical equipment needed for operation. Both boxes need to be waterproofed, in the event that the platform needs to be floated or towed by boat out to an island or waterlogged disaster area, which the instant invention is able to do through a plurality of detachable support buoys numbered 18 placed around the edge of the platform and under the platform, as needed.

Referring now to the wind turbine numbered 9, an exemplary embodiment mounts this horizontally with a venturi aperture number 10 preceding it towards the back of the platform. This secondary turbine is placed in the incoming direction of any high winds by aiming the venturing device facing into the prevailing winds. Since most near ground level winds are either non-existent or rather turbulent, this turbine is a horizontal axis savonious type, which, although inefficient, functions well in high turbulence and with low wind speeds; immediate electrical energy rather than high efficiency is the pressing concern in the aftermath of a catastrophe. Furthermore, it is likely that if there is much wind at or near ground level, then the likelihood of sun is much lower, and thus this wind, either high or low, will be the primary source of power. In front of the turbine and closer to the front of the platform are two sets of hinges numbered 12. When the restraining latches numbered 11, which connect the secondary wind turbine to the platform are released, the wind turbine is lowered to be level with the ground underneath, allowing the use of the secondary wind turbine as a water turbine as well. In an exemplary embodiment, the water turbine is placed in a swiftly running stream parallel to the part of the platform remaining above it, and securely on the stream's bed. Handles 22 are used to help lower the secondary wind turbine and are located on top of the larger end of the venturi aperture. Support rods 23 attach to these handles and to the frame to hold the venturi aperture to the frame should the water source be too deep for parallel streambed placement, or the platform needs to float. Support rods 23 are securely fastened on the front hitch numbered 17 when not in use, but room is to be left for fuel tanks, suitably propane but not limited thereto (tanks not shown). Further support to keep the 'drop down' water turbine in place is located at latches 24, which line up with latches numbered 11, and are attached to them should the water turbine be placed in water that does not allow parallel streambed placement with the platform above. In a deep water embodiment, the drop down turbine is closer in proximity to the turbine above it, as support rods 23 and latches 24, hold the venturi aperture in place. When the stream or other water source is no longer viable or not as efficient as wind power would be, the water turbine is lifted up again using handles 22, hinges 12, and locked back into place using latches numbered 11, and returns to its role as a secondary wind turbine. As is noted in the diagram, the only lower half of the secondary wind/water turbine is submerged in the venturi aperture, allowing an even greater pressure differential between the venturi exposed blades and those that are not when used as a wind turbine. When used as a water turbine, this is still true, especially in the case of a deep water application, where the venturi exposed blades are exposed to water and the non-venturi exposed blades to air.

Referring now to the platform itself, numbered 13. The platform is designed to be a predetermined length and a legally highway tow-able trailer. In an exemplary embodiment, a double axle trailer is shown numbered 16, but a single axle is also contemplated, as well as more than a two axle configuration considered. The base of platform 13 is wood (which is not shown) or any other buoyant material and framed with metal or any other strong composite material. The area directly underneath the venturi aperture numbered 10 and the secondary wind turbine numbered 9 has no wood or any other buoyant material beneath it to allow for the 'drop down' water turbine to operate. On the rest of platform 13 not containing box 14 or box 15 or rods 6 or grommets 7 or telescoping pole 1 or venturi aperture 10 or secondary turbine 9 are placed solar voltaic panels, shown as the shaded area. Each panel is designed to operate independently or in tandem, so that the failure of one panel will not dramatically affect the electrical power output. Surrounding the platform, and if necessary underneath it, are detachable buoys, numbered 18. Although the energy platform can be towed by air using grommets numbered 7, or floated using the buoys numbered 18, a hitch is provided numbered 17 for standard highway towing. Fuel, suitably propane but not limited thereto, for the backup fuel generator or for use by the rescue team, is mounted on the highway tow hitch numbered 17 behind secondary turbine support rods 23, as is usual with all highway legal trailers (tanks not shown).

While the invention has been described as with reference to an exemplary embodiment, it is understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An air-portable, vehicle tow-able, boat tow-able renewable energy generator comprising: a movable platform, said movable platform adapted for rapid response to an area by land, sea, or air, two wind energy extraction devices, one horizontally mounted lower to the ground, the other rotatable around a connection to said movable platform in the middle of the platform and having detachable blades, a venture aperture connected to the horizontally mounted wind energy extraction device, a swiveling telescoping primary turbine support pole centered in the middle of said platform, a solar energy extraction device or devices configured for transport on said platform, water energy extraction device configured for transport on said platform, said water energy extraction device or devices to be semi-detachable from the portable renewable energy platform, said platform's base to be constructed of wood, or another buoyant material, with the exception of a predetermined cutout area, and framed by metal or another strong composite material, a plurality of adjustable and fixable grommets, positioned around the edges of said movable platform, a battery system operable connected to said movable platform, said battery system configured to store and regulate electrical energy, a DC to AC inverter operable connected to said movable platform, detachable buoys around and underneath said platform, at least two waterproofed boxes: one for electrical equipment, batteries, battery chargers, an diverting equipment, and the other waterproofed box for storage of supplies including a small backup fuel generator, a plurality of detachable boots mounted at the end of turbine supporting rods.

\* \* \* \* \*